J. LAUX.
Sleigh Runner.

No. 83,864. Patented Nov. 10, 1868.

Inventor:
Jacob Laux

Witnesses:
C. E. Wait
Frank S. Alden.

JACOB LAUX, OF CLEVELAND, OHIO.

Letters Patent No. 83,864, dated November 10, 1868.

IMPROVEMENT IN SLEIGH-RUNNERS.

The Schedule referred to in these Letters Patent and making part of the same.

*To all whom it may concern:*

Be it known that I, JACOB LAUX, of Cleveland, in the county of Cuyahoga, and State of Ohio, have invented certain new and useful Improvements in Sleigh-Runners; and I do hereby declare that the following is a full and complete description of the same, reference being had to the accompanying drawings, making part of this specification, in which—

Figure 1:
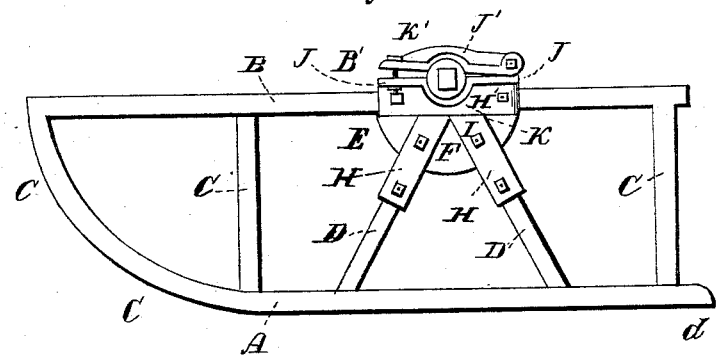
Figure 2:
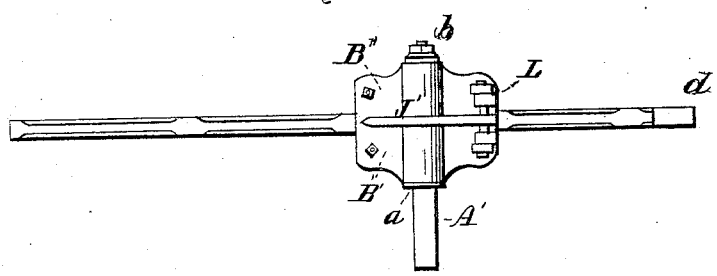
Figure 3:
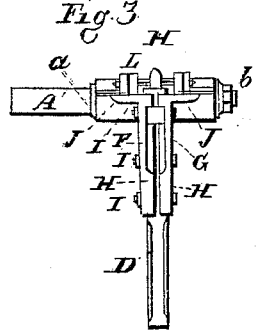

Figure 1 is a side view of the runner.
Figure 2 is a view of the top.
Figure 3, an end view.

Like letters refer to like parts in the different views presented.

The nature of this invention relates to a sleigh-runner, the same being so constructed that it can be attached to the body of a carriage, by simply removing the wheels therefrom, and putting the runners in place therefor, thus using the body of the carriage for the sleigh.

A, fig. 1, represents the runner, B, the side rail, and C, the standards or legs. D are also standards, arranged in an oblique position, the lower ends being secured in the runner, whereas the upper ends are clamped between the centre, E. Said centre consists of two semi-disks or plates, F G, fig. 3, each of which is provided with radial arms, H H', which, on the two disks being placed together, as shown in fig. 3, form sockets in which the ends of the oblique standards and rail are secured, the two being fastened together by the bolts I.

From the side of each disk projects horizontally a plate, J, in which is sunk a transverse groove, K, the purpose of which will hereinafter be shown. J' is a cap connected to the plates J, by means of the hinge L, whereby it can be lifted up or opened, as will presently be shown.

Transversely in this cap is sunk a groove, K', which, on being brought in direct relation to the grooves in the plates, forms a tapering box, in which the axle A' of the carriage is fitted, and secured by the cap J', as shown in fig. 1, in which it will be seen that the cap is fastened to the plates by the bolts B.

Having thus described the construction and arrangement of the device, the practical operation of the same, and its application, are as follows:

As above said, the wheels of the carriage are taken off, and in their place are attached the runners, by first lifting the cap J', and placing the axle in the groove in the plate. This being done, the cap is brought down upon the axle and bolted, as shown in fig. 1, thereby clamping the axle securely and firmly to the runner.

It will be observed that the width of the clamp is about the length of the axle; hence the collar *a* of the axle will prevent it from pushing through the box, and the nut *b* from coming off. The nut being secured tightly on against the outer end of the box, of necessity prevents all lateral movement of the runners.

It will be obvious that axles of different lengths and diameters can be used in connection with this clamp and runner, as the taper of the axle will prevent it from pushing into the box when clamped together, and the nut will prevent the same from being pulled out; hence no special fitting is required in making the attachment of the runner to the axles.

By the use of this runner, much expense is saved in the matter of sleighs, as a set of the runners can be easily and quickly attached to the body of the buggy, &c., and thereby convert it into a cheap, neat, and comfortable cutter, with the springs and thills thereto belonging, all in place for ease and convenience.

What I claim as my improvement, and desire to secure by Letters Patent, is—

1. The semi-disks or plates F, radial arms H H', in combination with the sleigh-runner, in the manner as and for the purpose specified.

2. The cap J', provided with a groove, K', as arranged, in combination with the plates J, for the purpose and in the manner set forth.

3. The centre, E, when constructed in two sections, in the manner substantially as set forth.

JACOB LAUX.

Witnesses:
J. H. BURRIDGE,
E. E. WAITE.